United States Patent
Kojima et al.

(10) Patent No.: US 6,933,959 B2
(45) Date of Patent: Aug. 23, 2005

(54) OPTICAL SCANNING DEVICE AND IMAGE FORMING APPARATUS

(75) Inventors: Akira Kojima, Chiba (JP); Nobuyuki Yanagawa, Kanagawa (JP); Masahiko Katoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 428 days.

(21) Appl. No.: 09/949,651

(22) Filed: Sep. 12, 2001

(65) Prior Publication Data

US 2002/0051272 A1 May 2, 2002

(30) Foreign Application Priority Data

Sep. 12, 2000 (JP) .................................... 2000-276691

(51) Int. Cl.[7] .................................................. B41J 27/00
(52) U.S. Cl. ...................................... 347/257; 347/242
(58) Field of Search ............................ 347/241–245, 347/256–261, 263

(56) References Cited

U.S. PATENT DOCUMENTS

| | | | |
|---|---|---|---|
| 4,647,961 A | 3/1987 | Kammoto et al. | 358/516 |
| 4,726,640 A | 2/1988 | Iwama et al. | 359/200 |
| 4,841,358 A | 6/1989 | Kammoto et al. | 358/512 |
| 4,968,997 A | 11/1990 | Saitoh et al. | 347/262 |
| 5,069,515 A | 12/1991 | Itami et al. | 359/200 |
| 5,194,959 A | 3/1993 | Kaneko et al. | 348/335 |
| 5,404,206 A | 4/1995 | Andoh et al. | 399/209 |
| 5,453,650 A | 9/1995 | Hashimoto et al. | 310/268 |
| 5,508,477 A | 4/1996 | Kato et al. | 181/205 |
| 5,510,664 A | 4/1996 | Suzuki et al. | 310/268 |
| 5,574,591 A | 11/1996 | Suzuki et al. | 359/200 |
| 5,606,448 A | 2/1997 | Suzuki et al. | 359/200 |
| 5,612,599 A | 3/1997 | Itami et al. | 318/254 |
| 5,675,431 A * | 10/1997 | Bock | 359/216 |
| 5,726,699 A | 3/1998 | Itami et al. | 347/257 |
| 5,739,602 A | 4/1998 | Suzuki et al. | 310/51 |
| 5,769,544 A | 6/1998 | Suzuki et al. | 384/115 |
| 5,909,966 A | 6/1999 | Suzuki et al. | 384/115 |
| 5,969,844 A | 10/1999 | Itami et al. | 359/200 |
| 6,150,779 A | 11/2000 | Itami et al. | 318/254 |
| 6,157,797 A | 12/2000 | Saito et al. | 399/107 |
| 6,215,974 B1 | 4/2001 | Katoh et al. | 399/258 |
| 6,256,461 B1 | 7/2001 | Takeyama et al. | 399/66 |
| 6,281,609 B1 | 8/2001 | Itami et al. | 310/68 B |
| 6,292,641 B1 | 9/2001 | Takeyama et al. | 399/228 |
| 6,308,027 B1 | 10/2001 | Obu et al. | 399/110 |
| 6,376,837 B1 | 4/2002 | Itabashi et al. | 250/234 |
| 6,465,918 B1 | 10/2002 | Itami et al. | 310/68 B |
| 6,473,113 B1 * | 10/2002 | Uzuki | 347/257 |
| 6,509,995 B1 | 1/2003 | Suzuki et al. | 359/196 |
| 6,542,707 B2 | 4/2003 | Muramatsu et al. | 399/258 |
| 6,597,883 B2 | 7/2003 | Muramatsu et al. | 399/258 |

FOREIGN PATENT DOCUMENTS

| | | | | |
|---|---|---|---|---|
| JP | 2-311813 | 12/1990 | | |
| JP | 2000258717 A | * 9/2000 | ........... | G02B/26/10 |
| JP | 2001-033720 | 2/2001 | | |

OTHER PUBLICATIONS

U.S. Appl. No. 10/817,249, filed Apr. 5, 2004, Nakano et al.

U.S. Appl. No. 09/500,731, filed Feb. 9, 2000.

(Continued)

*Primary Examiner*—Hai Pham
(74) *Attorney, Agent, or Firm*—Oblon, Spivak, McClelland, Maier & Neustadt, P.C.

(57) ABSTRACT

An optical box for positioning and fixing respective optical components is provided and functions as a housing thereof. A support stand for positioning and mounting the respective optical components, respectively, is formed separately from the optical box, and is loaded in the optical box.

12 Claims, 6 Drawing Sheets

OTHER PUBLICATIONS

U.S. Appl. No. 10/127,768, filed Apr. 23, 2002.
U.S. Appl. No. 09/633,867, filed Aug. 7, 2000.
U.S. Appl. No. 09/653,330, filed Aug. 31, 2000.
U.S. Appl. No. 09/827,097, filed Apr. 6, 2001.
U.S. Appl. No. 09/833,821, filed Apr. 13, 2001.
U.S. Appl. No. 10/028,698, filed Dec. 28, 2001.
U.S. Appl. No. 10/047,698, filed Jan. 18, 2002.
U.S. Appl. No. 10/084,485, filed Feb. 28, 2002.
U.S. Appl. No. 10/085,707, filed Mar. 1, 2002.
U.S. Appl. No. 10/096,250, filed Mar. 13, 2002.
U.S. Appl. No. 10/226,344, filed Aug. 23, 2002.
U.S. Appl. No. 09/814,862, filed Mar. 23, 2001.
U.S. Appl. No. 09/962,580, filed Sep. 26, 2001.
U.S. Appl. No. 09/964,584, filed Sep. 28, 2001.
U.S. Appl. No. 09/987,027, filed Nov. 13, 2001.
U.S. Appl. No. 10/073,237, filed Feb. 13, 2002.
U.S. Appl. No. 10/101,994, filed Mar. 21, 2002.
U.S. Appl. No. 10/155,088, filed May 28, 2002.
U.S. Appl. No. 10/189,232, filed Jul. 5, 2002.
U.S. Appl. No. 10/231,281, filed Aug. 30, 2002.
U.S. Appl. No. 10/293,334, filed Nov. 14, 2002.
U.S. Appl. No. 10/379,533, filed Mar. 6, 2003, Takeyama et al.
U.S. Appl. No. 10/609,398, filed Jul. 1, 2003, Kibune et al.
U.S. Appl. No. 10/609,577, filed Jul. 1, 2003, Nakajima et al.
U.S. Appl. No. 10/669,009, filed Sep. 24, 2003, Takeyama et al.
U.S. Appl. No. 10/870,958, filed Jun. 21, 2004, Takeyama et al.
U.S. Appl. No. 09/949,651, filed Sep. 12, 2001, Kojima et al.

* cited by examiner

OPTICAL SCANNING DEVICE AND IMAGE FORMING APPARATUS

BACKGROUND OF THE INVENTION

1. Field of the Invention

The present invention generally relates to an optical scanning device and an image forming apparatus employing the optical scanning device which is used for a laser printer, a laser facsimile, a digital copier, etc.

2. Description of the Related Art

It is general to write, by beam light (or laser beam) deflected by an optical scanning device, onto a photo conductor in an image forming apparatus according to an electrostatic photographic process in recent years correspondingly to digitization of an image forming apparatus. In the optical scanning device, it is necessary to carry out incidence of the beam light at a predetermined position on the photo conductor correctly.

For this purpose, to position correctly optical components thereof, such as various kinds of lenses, mirrors and so forth arranged inside the optical scanning device into an arrangement defined optically is demanded. Simultaneously, deformation of these components by stress, vibration, heat, etc. from the inside and outside of the optical scanning device must be prevented, and, thus, the beam light must be scanned correctly.

Furthermore, it is in the tendency to miniaturize the optical scanning device in an image forming apparatus from the request of the latest demand to save a space, and, for this purpose, it is necessary to bend the light path of beam light by several mirrors.

Such a space-saving optical scanning device should cause the beam light emitted from a beam light emitting device to pass through a cylindrical lens, make it reflected/deflected by a polygon mirror, and cause it to pass an fθ lens, cause the beam light to be bent by first and second mirrors which intersect perpendicularly mutually, and cause it to pass a long lens, and it is made to be reflected by a third mirror to the outside through a dust-proof glass. In addition, optical components, such as those lenses and mirrors, are arranged in predetermined positions, respectively, in a sealed optical box.

In the image forming apparatus equipped with such an optical scanning device, the beam light reflected to the outside by the third mirror is incident on the surface of a photo conductor, and, after forming of an electrostatic latent image on the rotating photo conductor by scanning the photo conductor with a straight line with rotation of the polygon mirror, a visible image is formed through a well-known electrophotographic image formation process.

Figure 1:
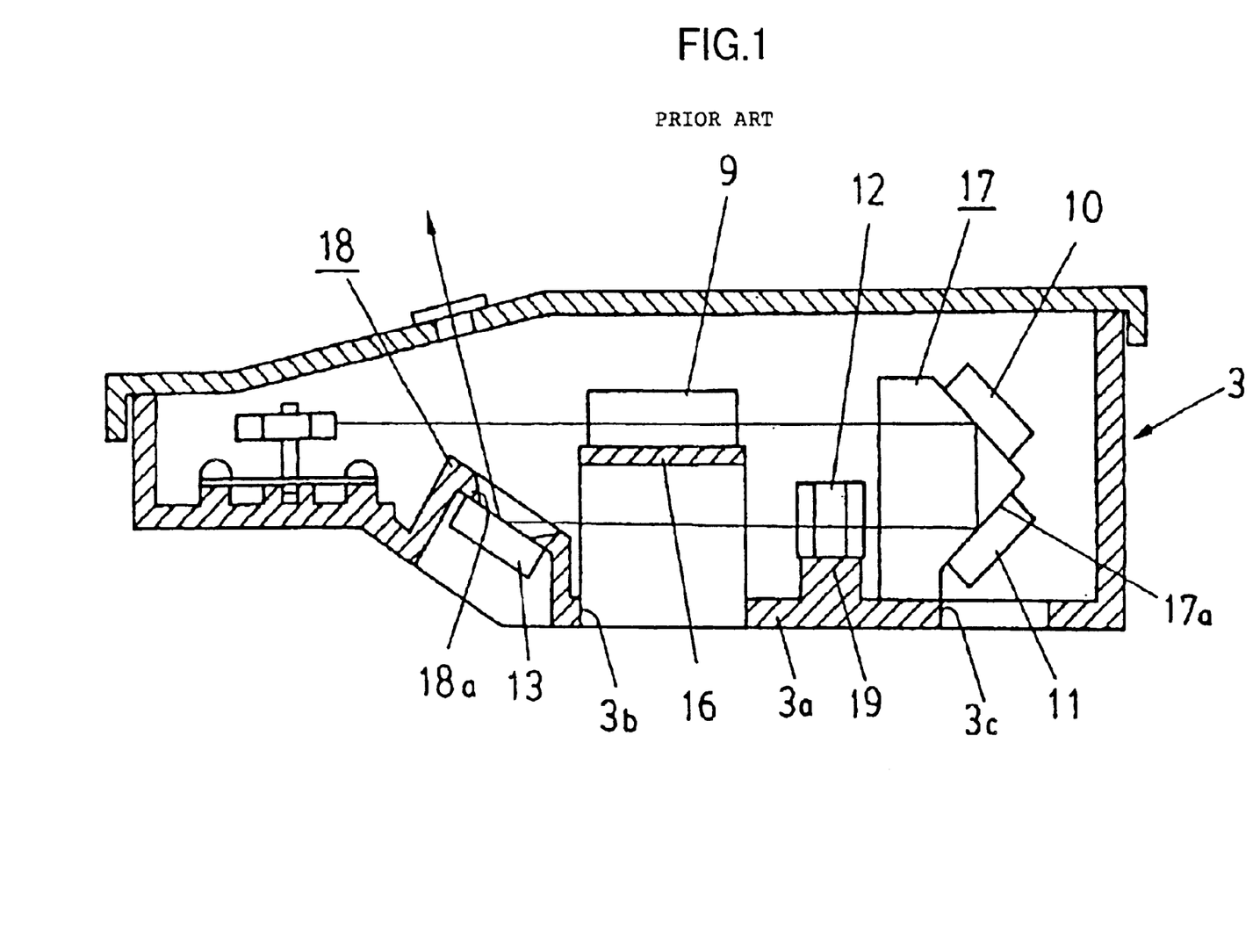
FIG. 1 shows a side-elevational sectional view of an internal configuration of an optical box of an optical scanning device in the related art.
Figure 2:
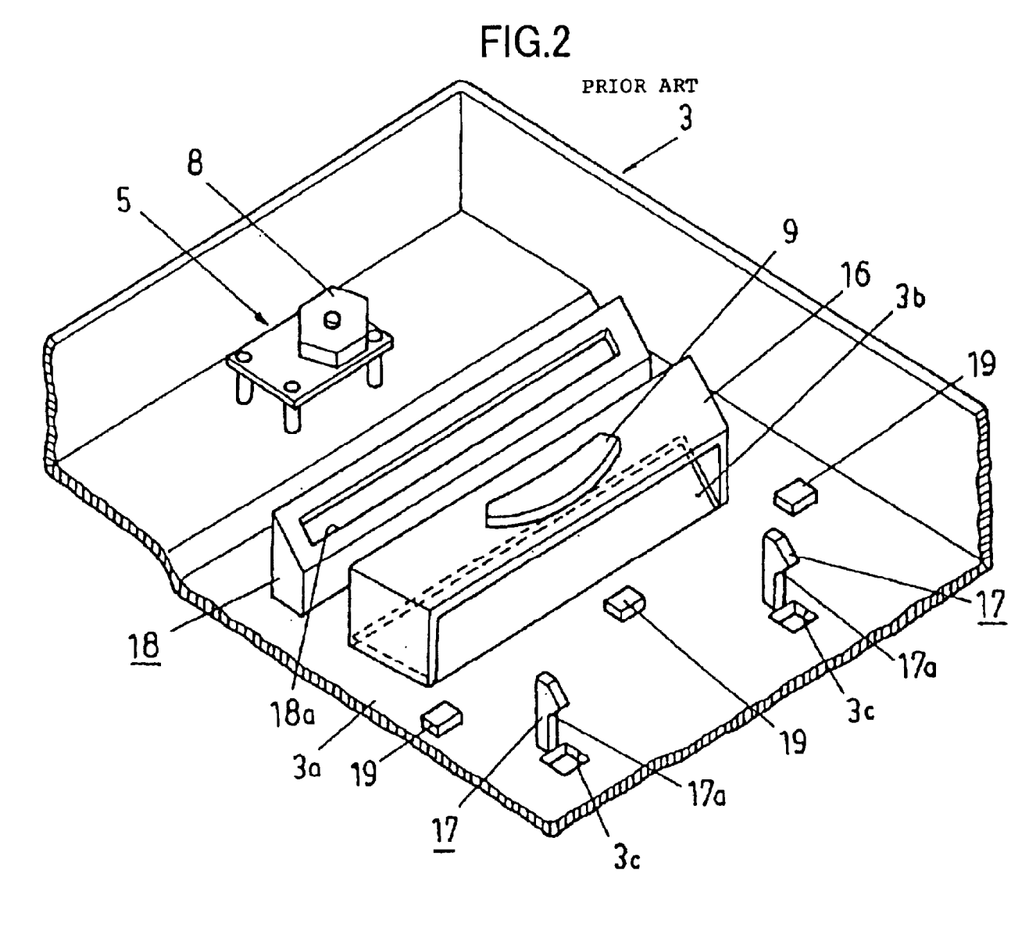
FIG. 2 shows a perspective view showing an essential part of the optical scanning device shown in FIG. 1.

FIG. 1 shows a sectional view showing an example in which an optical box of an optical scanning device is formed with resin by integral mold. FIG. 2 shows a perspective view of an essential part thereof, and other optical components than the fθ lens is omitted from indication there.

On a bottom surface 3a which is in a main surface of the optical box 3, an fθ lens receiving part 16 for positioning and fixing the fθ lens 9, a pair of first and second mirror receiving parts 17, 17 for positioning and fixing a first mirror 10, and a second mirror 11, a third mirror receiving part for positioning and fixing a third mirror 13, a long lens receiving part 19 for fixing a long lens 12 are formed integrally with the optical box 3, respectively.

A reference part for positioning is formed in each of these receiving parts, and, with a leaf spring or the like, each optical component is fixed to a respective positioning reference part by pressure (not shown). Thereby, the optical components, such as the above-mentioned lenses and mirrors, are correctly arranged in the predetermined positions.

In the configuration of the optical box 3, under the fθ lens receiving part 16, an opening 3b is formed in the bottom surface 3a for allowing a moving mold to be inserted from the bottom in the integral molding process of the optical box 3, and, similarly, under the first and second mirror receiving parts 17, 17, openings 3c, 3c are formed in the bottom surface 3a for allowing the moving mold to be inserted from the bottom partially because receiving surfaces 17a, 17a for the second mirrors 11 are formed by under-cut in the molding process. Moreover, in the third mirror receiving part 18, in order to secure a light path before and after the reflection by the third mirror 13, slit-like opening 18a is formed.

However, while having to prepare much opening parts in the bottom surface as mentioned above, therefore the rigidity of the optical box and vibration-proof nature thereof are degraded when integral molding of the optical box with resin is performed, and, also, in order to secure dust proof performance, covering members and seal members for closing these opening parts are needed.

Moreover, since most of these main optical components are directly arranged on the bottom surface of the optical box, there may be a possibility that the exact positional relationship between the respective optical components is degraded by uneven expansion/shrinkage of the optical box by change of environmental temperature, and degradation of plane nature of the bottom surface and deformation of the whole optical box due to aging factor, etc., thus, it may not be possible to maintain a stable optical performance.

In addition, due to a slight difference in length of a light path caused by a change in designed wavelength of the beam light, it is necessary to remake a metallic mold for molding the optical box which is a rather large-sized mold. Thereby, the time, effort and cost needed therefor may be remarkably large.

SUMMARY OF THE INVENTION

The present invention has been devised in view of the above-mentioned points, and an object of the present invention is to provide an optical scanning device and an image forming apparatus employing the optical scanning device by which the rigidity of the optical box and vibration-proof nature thereof are improved, and includes a small number of components, and can easily be made adapted to a design change in light path and so forth.

An optical scanning device according to the present invention includes:

a beam light ejecting part ejecting beam light (a laser beam);

a deflecting part deflecting the ejected beam light;

a plurality of optical components comprising lens and mirror for forming an image of the deflected beam light in a predetermined position; and an optical box for positioning and mounting thereonto the respective optical components, wherein:

support stand portions for positioning and mounting the respective optical components, respectively, are formed separately from the optical box; and the support stand portions are loaded in the optical box.

In this configuration, since the support stand portions which position and mount thereonto the lenses and mirrors, respectively, are formed as members separate from the optical box, the optical box can have a simple flat main surface, and thus it becomes unnecessary to prepare opening parts for forming respective receiving stands of the lenses and mirrors in the optical box, and, thus, the optical box can be made into a simple form.

Consequently, while the covering members and sealing members which close the opening parts in order to secure protection-against-dust nature and soundproofing become unnecessary, and lead to reduction of the production cost, the rigidity and vibration-proof nature of the optical box can be improved, and the optical scanning device can be easily adapted to a change in design light-path length.

The support stand portions for positioning the respective optical components, respectively, may be formed integrally with each other.

In this configuration, since the support stand portions which position and fix thereonto the above-mentioned lenses and mirrors, respectively, are formed integrally with each other, a highly precise optical scanning optical system is realizable.

The support stand portions may be formed on a main surface of the optical box in a form of a scaffold.

Thereby, since the above-mentioned support stand portions are formed in the shape of the scaffold, the arrangement position of each optical component fixed to the support stand is prevented from easily being influenced by the degree of plane (planarity) of the main surface of the optical box, deformation of the optical box itself, etc.

The scaffold-like support stand may have a space through which the beam light passes between the support stand and the main surface of the optical box.

Thereby, since the support stand formed in the shape of the scaffold has the space through which the beam light passes between the main surface of the optical box and the support stand, the spaces of the upper and lower sides of the support stand can be utilized effectively, and thus, further miniaturization of the optical scanning device is attained.

The support stand may be made of a material having an expansivity smaller than that of a material of the optical box.

Thereby, even when the environmental temperature varies, change in positional relationship among the respective optical components can be suppressed small, and it becomes possible to achieve a superior optical performance thereby.

The beam light deflected by the deflecting part may be bent by at least one optical component, and, then, passes between the deflecting part and this at least one optical component.

Thereby, the light path is made to draw a figure like a numeral "4", and, as a result, it is possible to further miniaturize the optical scanning device.

An image forming apparatus according to the present invention includes:

the above-mentioned optical scanning device; and an image forming part which forms an image on a photo conductor by writing thereon with the beam light deflected by the optical scanning device.

By configuring an image forming apparatus equipped with an optical scanning device as described above, rigidity and vibration-proof nature are high, it can be easily adapted to a change in light-path length caused by a design change of the oscillation wavelength of the beam light ejection part, etc., and the stable image formation is attained thereby.

Thereby, it becomes possible to form a satisfactory image always positively stabilized even in an aging change or an environmental temperature change.

Other objects and further features of the present invention will become more apparent from the following detailed description when read in conjunction with the accompanying drawings.

DETAILED DESCRIPTION OF THE PREFERRED EMBODIMENT

Hereafter, an embodiment of the present invention will be concretely explained based on the figures.

Figure 3:
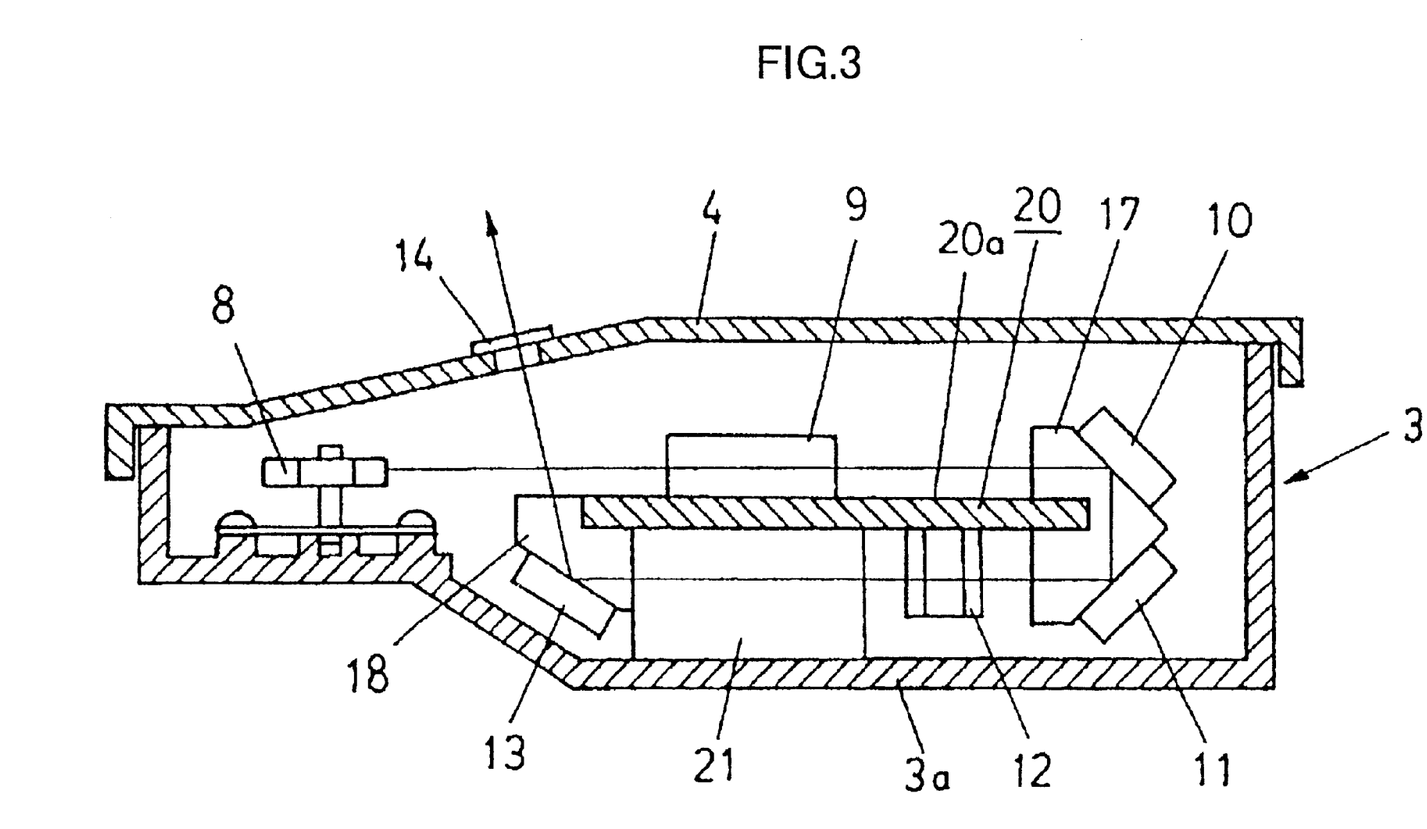
FIG. 3 shows a side-elevational sectional view of an internal configuration of an optical box of an optical scanning device in an embodiment of the present invention.
Figure 4:
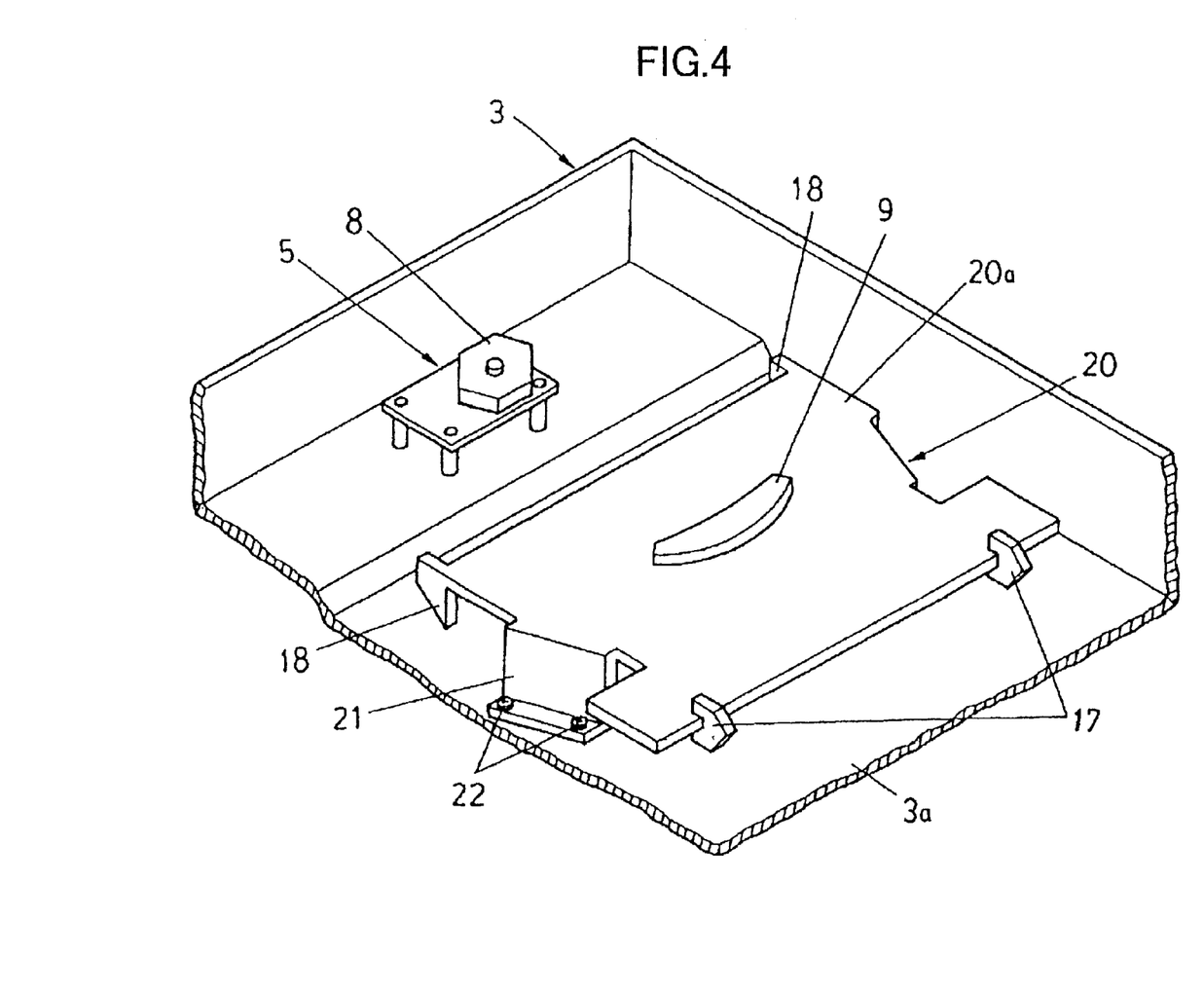
FIG. 4 shows a perspective view showing an essential part of the optical scanning device shown in FIG. 3.
Figure 5:
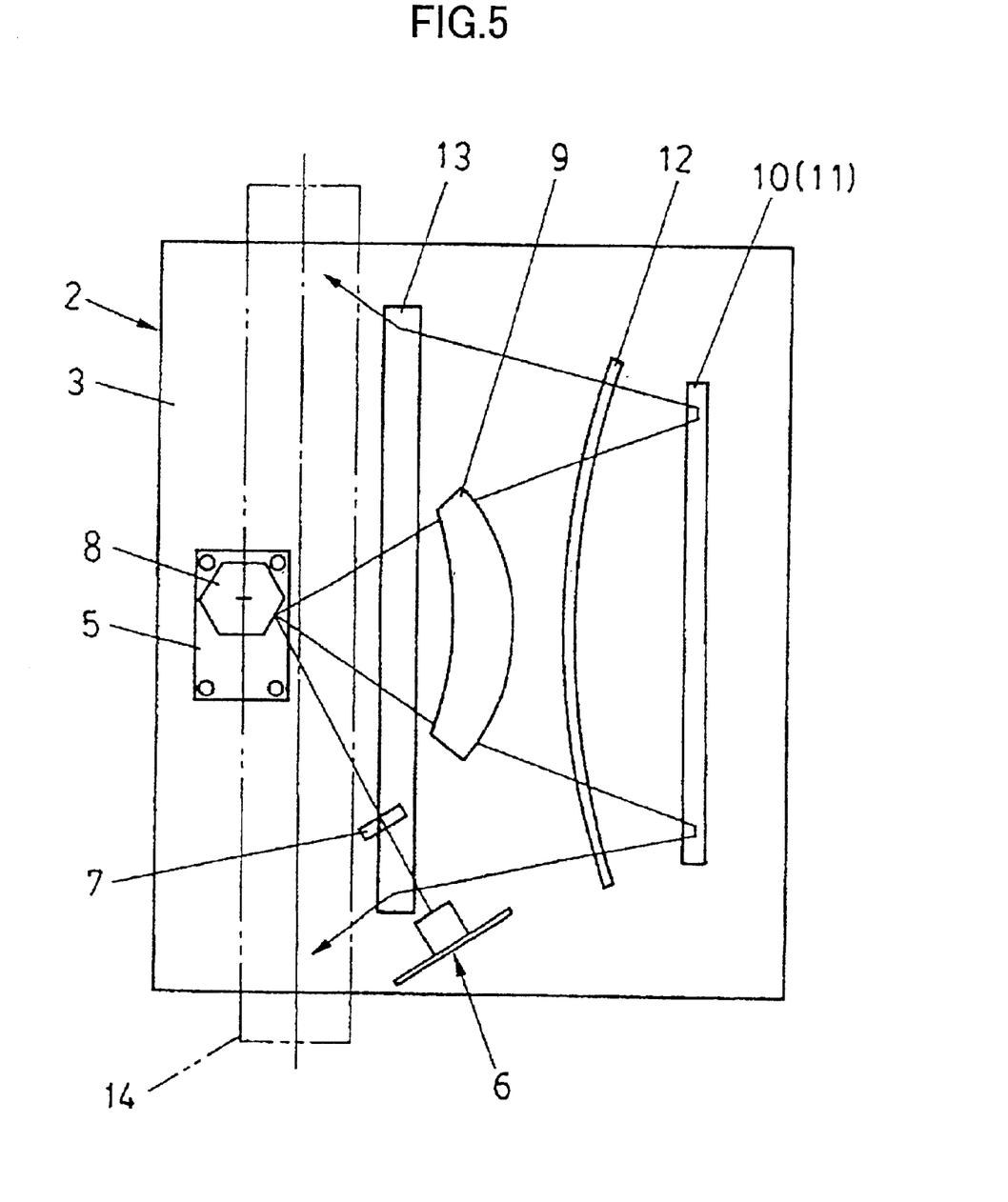
FIG. 5 shows a plan view showing a light path of the optical scanning device shown in FIG. 3.
Figure 6:
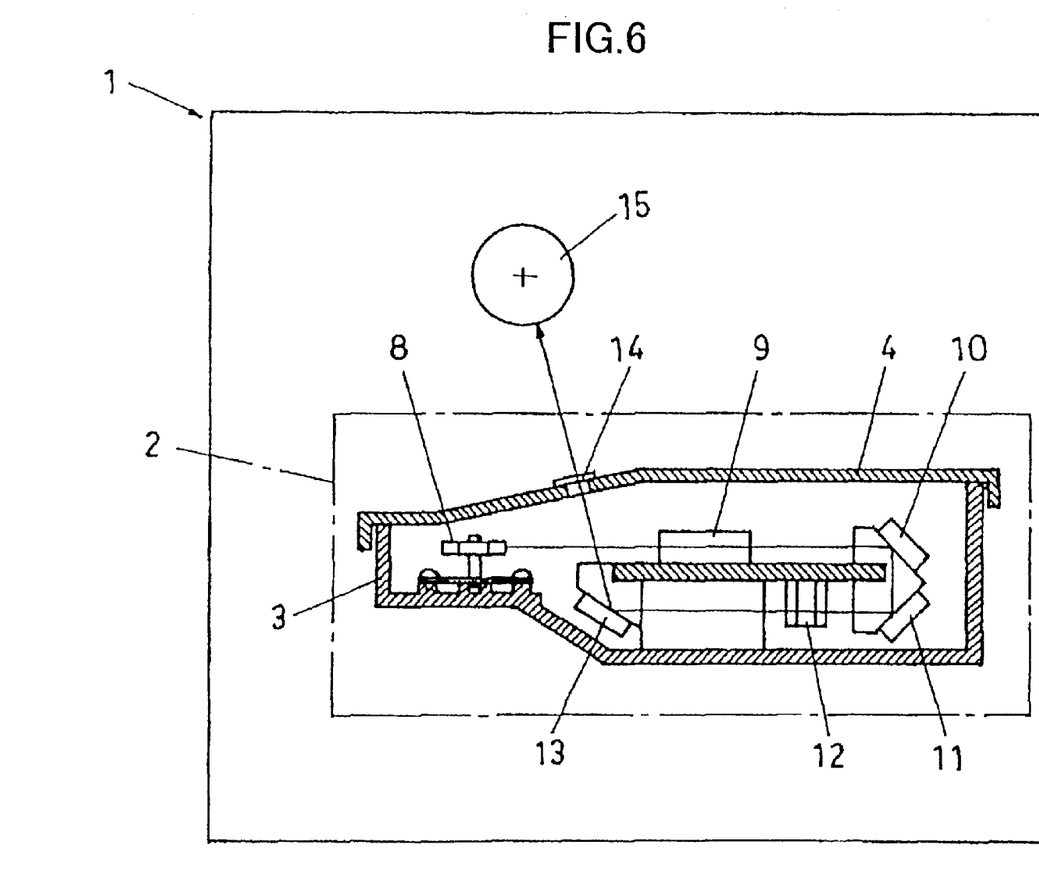
FIG. 6 shows a general side-elevating sectional view of an image forming apparatus employing the optical scanning device shown in FIG. 3.

FIG. 3 shows a side-elevational sectional view of an optical scanning device in the embodiment of the present invention, FIG. 4 shows a perspective view of an essential part thereof, FIG. 5 shows a plan view thereof showing a light path thereof, and FIG. 6 shows a general side-elevational sectional view of an image forming apparatus employing this optical scanning device. In addition, in these views, the same reference numerals are given for the components/parts corresponding to those shown in FIGS. 1 and 2, and explanation thereof will be omitted. Moreover, in FIG. 4, for the purpose of simplification of the figure, respective optical components are omitted other than some.

With reference to FIGS. 5 and 6, a configuration of the image forming apparatus employing the optical scanning device in the embodiment of the present invention will now be described first.

The optical scanning device 2 is provided in the inside of the image forming apparatus 1 shown in FIG. 6 includes an optical box 3 functioning as a housing thereof, a cover 4 which intercepts this optical box 3 from the outside, and achieves the function of protection against dust and noise insulation. It also includes several optical components which consist of a laser light emitting unit 6 acting as a beam light ejection means, various kinds of lenses and mirrors, together with a polygon motor 5 shown in FIG. 5.

As shown in FIG. 5, after reflection/deflection of the beam light ejected from the laser light emitting unit 6 by the polygon mirror 8 through the cylinder lens 7 and passing through an fθ lens 9, the beam light is bent to an opposite direction by a first mirror 10 and a second mirror 11, is reflected by a third mirror 13 after passing through a long lens 12, and is led onto a photo conductor 15 (FIG. 6) of the image forming apparatus 1 through a dust-proof glass 14. Thus, the miniaturization of the optical scanning device 2 is attained by reversing the light path using the several mirrors.

At this time, the beam light ejected from the laser light emitting unit 6, and incident onto the polygon mirror 8 through the cylinder lens 7 is used to scan the surface of the rotating photo conductor 15 by a straight line repeatedly with the rotation of the polygon mirror 8 driven by the polygon motor 5, and thus, an electrostatic latent image is formed on the surface of the photo conductor 15. Then, through an image formation process in a well-known technology of electrophotography, a visible image is obtained thereby.

That is, the electrostatic latent image formed on the photo conductor 15 is converted into a visible image by a toner of a development unit, and is transferred onto a paper fed one by one by a paper feeding unit not shown in the figure. The paper onto which the transfer of the toner image is made undergoes a fixing process by which the toner image is fixed onto the paper which is then ejected from the image forming apparatus.

The optical box 3 which constitutes the outer frame of the optical scanning device 2 is formed by integral molding of resin with high rigidity, for example, into a box-shaped configuration having a flat bottom surface 3a which is a main surface of the box, as shown in FIGS. 3 and 4. And a support stand 20 of a shape of a scaffold formed as a separate member is fixed integrally onto the bottom surface 3a by several screws 22 through a pair of legs 21, 21 (only one is shown in FIGS. 3 and 4) formed as a result of being integrally molded with the support stand 20.

A pair of mirror receiving parts 17, 17 onto which the first mirror 10 and second mirror 11 are mounted, and a pair of third mirror receiving parts 18, 18 onto which the third mirror 13 is mounted are provided integrally in the support stand 20. Further, a positioning reference part (not shown in the figure) for positioning and press-fixing the fθ lens 9 therewith is provided on a top surface of a stand plane 20a of the support stand 20, and, also, a positioning reference part (not shown in the figure) for positioning and press-fixing the long lens 12 therewith is provided on a bottom surface of the stand plane 20a of the support stand 20. Further, a space through which the beam light passes is provided between the stand plane 20a of the support stand 20 and the bottom surface 3a of the optical box 3. And the material of this support stand 20 is such as that to have an expansivity smaller than that of the material of the optical box 3.

Examples of the materials are shown below:

| Application | Material | Expansivity: 1/k |
|---|---|---|
| Optical Box 3 | polyethylene | 11.0 through 13.0 |
| | polypropylene | 5.8 through 10.2 |
| | ABS resin | 9.5 through 13.0 |
| Support Stand 20 | polycarbonate | 6.6 |
| | denatured PPO | 5.2 |
| | polyimide (including glass) | 1.5 |

By molding the optical box 3 into a simple box-shaped configuration having the plane bottom surface 3a, various types of openings which are needed in the optical box in the related art having the receiving parts for the respective optical components formed by integral molding become not needed, and, also, the shape of the box becomes less complicated, according to the embodiment of the present invention. Thereby, fabrication of the metallic mold for molding of the optical box 3 becomes easier, and, the efficiency in molding process becomes improved, according to the embodiment of the present invention. Moreover, as compared with the configuration in the related art in which the respective optical components are arranged on the main surface of the integrally molded optical box directly, the degree of plane (planarity) of the main surface and the degree of rigidity of the whole optical box can also be improved.

Furthermore, by forming the support stand 20 in the shape of a scaffold separate from the optical box 3 itself, the arrangement position of each optical component becomes hardly influenced by the planarity of the main surface of the optical box 3 and/or deformation of the optical box 3, and so forth. Also, the arrangement position of each optical component becomes hardly influenced by temperature change, and so forth, by making the material of the support stand 20 into what has the expansivity smaller than that of the material of the optical box 3. Simultaneously, by thus effectively reducing the use of such a type of expensive material, the production cost as the whole optical box can be reduced.

Moreover, since the support stand 20 is formed in the shape of a scaffold and allows the passage of beam light thereunder, while the miniaturization of the optical box 3 is attained, and, also, when the light path length changes with a design change of the oscillation wavelength of the laser light emitting (oscillation) unit 6, it can be easy to make it to be adapted to this design change by modifying only the support stand 20.

In addition, it is also possible to form the optical box 3 by aluminum diecast molding, etc., although resin molding of the optical box 3 is carried out in the above-described embodiment. Thereby, it is possible to omit the opening parts needed for molding employing the metallic mold, and, also, opening parts required for allowing insertion of the edge of a blade of a tool into a part to be worked thereby, etc.

Moreover, although, the lens support stands for positioning and fixing the fθ lens and long lens, and mirror support stands for positioning and fixing the first, second and third mirrors are formed integrally in the support stand, it is also possible to form these respective support stands separately/individually as separate members, and fix them onto the bottom surface of the optical box.

The present invention may also be applied to a multi-beam optical scanning device such as that disclosed in Japanese Laid-Open Patent Application No. 2001-33720, for example.

Further, the present invention is not limited to the above-described embodiment, and variations and modifications may be made without departing from the scope of the present invention.

The present application is based on Japanese priority application No. 2000-276691, filed on Sep. 12, 2000, the entire contents of which are hereby incorporated by reference.

What is claimed is:

1. An optical scanning device comprising:

a beam light ejecting part configured to eject a beam light;

a deflecting part configured to deflect the ejected beam light;

a plurality of optical components including a lens and a mirror and configured to form an image of the deflected beam light in a predetermined position;

an optical box configured to house the respective optical components; and support stand parts provided separately from said optical box and configured to mount to the optical box and to support the plurality of optical components, wherein the support stand parts are formed integrally with one another.

2. The optical scanning device of claim 1, wherein said support stand parts are mounted on a main surface of said optical box and are arranged as a scaffold support stand.

3. The optical scanning device of claim 2, wherein the scaffold support stand has a space through which the beam light passes between said support stand and said main surface of said optical box.

4. The optical scanning device of claim 1, wherein said support stand parts are made of a material having an expansivity smaller than that of a material of said optical box.

5. The optical scanning device of claim 1, wherein the beam light deflected by said deflecting part is redirected by at least one of the plurality of optical components such that the beam light passes between said deflecting part and said at least one optical component.

6. An image forming apparatus comprising: an optical scanning device including, a beam light ejecting part configured to eject a beam light, a deflecting part configured to deflect the ejected beam light, a plurality of optical components including a lens and a mirror and configured to form an image of the deflected beam light in a predetermined position, an optical box configured to house the respective optical components, and support stand parts provided separately from said optical box and configured to mount to the optical box and to support the plurality of optical components, the support stand parts being formed integrally with one another; and a photo conductor on which the image is formed by writing thereon with the beam light directed by said optical scanning device.

7. An optical scanning device comprising:

beam light ejecting means for ejecting a beam light;

deflecting means for deflecting the ejected beam light;

optical means for forming an image of the deflected beam light in a predetermined position;

housing means for housing the respective optical means; and support stand means provided separately from said housing means, for mounting to the housing means, and for supporting the optical means, wherein the support stand means is formed as an integral structure.

8. The optical scanning device of claim 7, wherein said support stan means is mounted on a main surface of said housing means and is arranged in a form of a scaffold.

9. The optical scanning device of claim 8, wherein said support stand means has a space through which the beam light passes between said support stand means and said main surface of said housing means.

10. The optical scanning device of claim 7, wherein said support stand means includes a material having an expansivity smaller than that of a material of said housing means.

11. The optical scanning device of claim 7, wherein the beam light deflected by said deflecting means is redirected by the optical means such that the beam light passes between said deflecting means and said optical means.

12. An image forming apparatus comprising: an opticals canning device including, beam light ejecting means for ejecting a beam light, deflecting means for deflecting the ejected beam light, optical means for forming an image of the deflected beam light in a predetermined position, housing means for housing the respective optical means, and support stand means provided separately from said housing means, for mounting to the housing means, and for supporting the optical means; and a photo conductor on which the image is formed by writing thereon with the beam light directed by said optical scanning device, wherein the support stand means is formed as an integral structure.

* * * * *